United States Patent
Watanabe et al.

[11] Patent Number: 5,880,509
[45] Date of Patent: Mar. 9, 1999

[54] SEMICONDUCTOR PRESSURE SENSOR AND ITS MANUFACTURING METHOD

[75] Inventors: Tatsuya Watanabe; Takahiro Kudo; Kyoichi Ikeda, all of Tokyo, Japan

[73] Assignee: Yokogawa Electric Corporation, Tokyo, Japan

[21] Appl. No.: 849,832

[22] PCT Filed: Mar. 28, 1996

[86] PCT No.: PCT/JP96/00816

§ 371 Date: Oct. 29, 1996

§ 102(e) Date: Oct. 29, 1996

[87] PCT Pub. No.: WO96/30950

PCT Pub. Date: Oct. 3, 1996

[30] Foreign Application Priority Data

Mar. 29, 1995 [JP] Japan ................................. 7-071211

[51] Int. Cl.$^6$ .................................................. H01L 29/82
[52] U.S. Cl. .......................... 257/419; 257/417; 438/50; 438/53

[58] Field of Search ...................................... 257/417, 419; 438/50, 53

[56] References Cited

U.S. PATENT DOCUMENTS

| | | | |
|---|---|---|---|
| 4,993,143 | 2/1991 | Sidner et al. | 29/621.1 |
| 5,242,863 | 9/1993 | Xiang-Zheng et al. | 437/228 |
| 5,369,544 | 11/1994 | Mastrangelo | 361/283.4 |

*Primary Examiner*—Olik Chaudhuri
*Assistant Examiner*—Douglas A. Wille

[57] ABSTRACT

The present invention relates to a semiconductor pressure sensor comprising a single crystal silicon substrate;

a closed air gap chamber provided on the said single crystal silicon substrate, on which a measured diaphragm made by epitaxial growth is formed and which has a predetermined narrow gap backing up the application of over-pressure to the said diaphragm; and a strain detection element incorporated in the said measuring diaphragm.

5 Claims, 3 Drawing Sheets

SEMICONDUCTOR PRESSURE SENSOR AND ITS MANUFACTURING METHOD

FIELD OF THE INVENTION

The present invention relates to a highly reliable semiconductor pressure sensor having good accuracy and sensitivity, whose measuring diaphragm is composed of an epitaxially grown single silicon crystal, and to its manufacturing method.

BACKGROUND OF THE INVENTION

FIG. 1 shows a drawing illustrating the essential part of the configuration which has been used so far. Such a configuration is shown, for example, in "Fine-grained Polysilicon and its Application to Planar Pressure Transducers," by H. Guckel, et al., TRANSDUCERS '89 PROCEEDINGS Vol. 2, pp.346 to 351.

In FIG. 1,

Number 11 shows a silicon substrate, 12 a measuring diaphragm made of polysilicon forming air gap chamber 13 together with the silicon substrate. Number 14 shows a piezo-resistance strain gage formed on the surface of measuring diaphragm 12. Number 15 shows a connecting hole provided in measuring diaphragm 12 and connects air gap chamber 13 to the outside. Number 16 shows a polysilicon thin film which fills connecting hole 15.

In this configuration, air gap chamber 13 is constructed by forming a solid part corresponding to air gap chamber 13 with silicon oxide film, then removing silicon oxide film using selective etching from connecting hole 15 which connects air gap chamber 13 to the outside, and filling connecting hole 15 with polysilicon thin film 16 formed by reduced-pressure chemical vapor deposition (CVD). The adoption of a reduced-pressure CVD retains air gap chamber 13 as a virtually sufficient vacuum for the reference pressure for the absolute pressure sensor.

However, in such equipment,
(1) Since internal stress is likely to exist because measuring diaphragm 12 is composed of polysilicon, the stiffness of the measuring diaphragm changes due to heat treatment.
(2) Since piezo-resistance strain gage 14 must be formed on polysilicon measuring diaphragm 12, its sensitivity becomes low.

The present invention intends to solve these problems.

Although it is not easy to form single crystals of silicon on silicon oxide film, in recent years, a good silicon-on-insulation (SOI) wafer has become available because of the development of semiconductor processing techniques.

The present invention has been contrived by paying attention to such a situation. The purpose of this invention is to provide a highly reliable semiconductor pressure sensor having good accuracy and sensitivity and its manufacturing method, whose measuring diaphragm is composed of epitaxially grown single silicon crystals.

SUMMARY OF THE INVENTION

In order to achieve this purpose, the present invention adopts:
(1) A semiconductor pressure sensor comprising a single crystal silicon substrate; a closed air gap chamber having a predetermined narrow gap which backs up an overpressure application to a diaphragm provided with the single crystal silicon substrate and forming a measuring diaphragm made by epitaxial growth; and a strain detection element incorporated in the above-described measuring diaphragm composed of a single crystal.

(2) A manufacturing method for a semiconductor pressure sensor in which an air gap chamber is incorporated within a single crystal silicon substrate, wherein the following processes are included:
(a) A process to remove the SOI silicon and insulation film from an SOI wafer by photo-lithography leaving the required portions of them,
(b) A process to make an epitaxial layer grow on the side of the SOI surface of the above-described SOI wafer to form a measuring diaphragm,
(c) A process to form a strain detection element on the above measuring diaphragm,
(d) A process to form a connecting hole reaching the above insulation film on the above SOI surface side,
(e) A process to remove the above-described insulation film by selective etching through the above connecting hole, and
(f) A process to fill the connecting hole with thin film.

In the above configuration, the SOI silicon and insulation film of the SOI wafer are removed by photo-lithography leaving the required portions. An epitaxial growth layer is made on the SOI surface side of the SOI wafer to form the measuring diaphragm. The strain detection element is formed on the measuring diaphragm. A connecting hole reaching the insulation film is formed on the SOI surface side. The insulation film is removed by selective etching through the connecting hole. Finally, the connecting hole is filled with a thin film.

As a result, since a semiconductor pressure sensor can be entirely constructed with single crystal silicon,
(1) A high-sensitivity strain detection element can be incorporated, and
(2) A measuring diaphragm which is more stable and has a higher accuracy than polysilicon materials can be constructed.

Therefore, the present invention can offer a highly reliable semiconductor pressure sensor with excellent accuracy and sensitivity composed of epitaxially grown single silicon crystals.

BEST MODE IN EMBODYING THE PRESENT INVENTION

Figure 1:
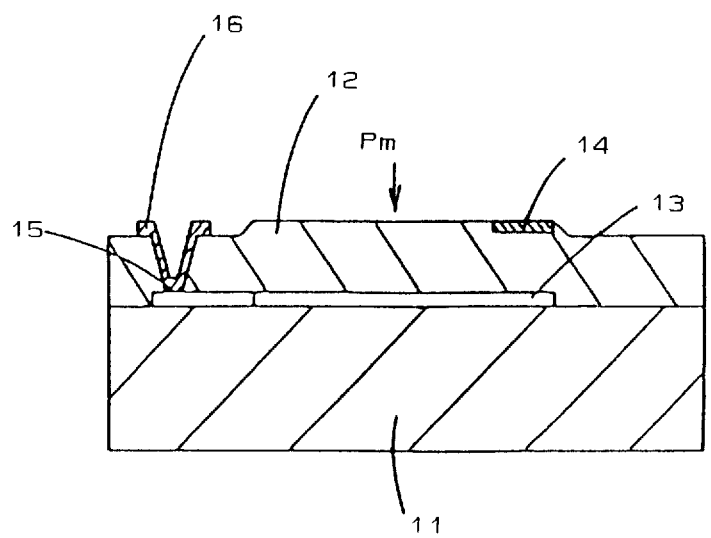
FIG. 1 shows a drawing illustrating the essential part of the configuration which has been used so far.
Figure 2:
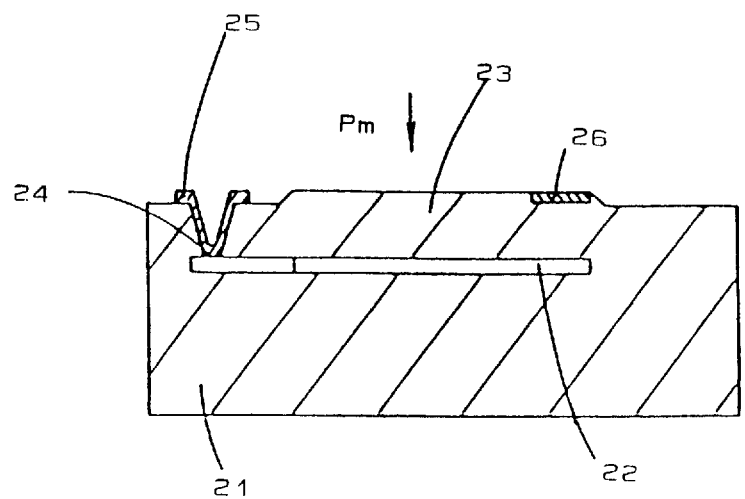
FIG. 2 shows a drawing illustrating the configuration of an embodiment of the present invention.

Hereafter, the present invention will be described in detail using the drawings. FIG. 2 shows a drawing illustrating the configuration of the essential part of an embodiment of the present invention.

Number 21 shows a silicon single crystal substrate. Number 22 shows an air gap chamber provided in silicon single crystal substrate 21 to form measuring diaphragm 23 in silicon single crystal substrate 21. Number 24 indicates a connecting hole to connect air gap chamber 22 to the outside. Number 25 shows a piece of thin film to fill connecting hole 24. For thin film 25, for example, polysilicon manufactured by a reduced-pressure CVD process is used.

Although the pressure of the atmosphere at the time of manufacturing the polysilicon film by the reduced-pressure CVD process is confined inside air gap chamber 22, since that pressure is about 0.2 Torr, it is a vacuum sufficient for the reference pressure of the absolute pressure sensor.

Number 26 shows a strain detection sensor provided on measuring diaphragm 23. For strain detection sensor 26, for example, a piezo-resistance strain gage or a both-end fixed beam vibration strain gage is used.

In the above configuration, if measuring pressure Pm is applied, measuring diaphragm 23 deflects proportional to the difference between the measuring pressure and the pressure in air gap chamber 22 (approximately a vacuum), and so a quantity of strain is applied to strain detection sensor 26. Measuring pressure Pm is detected by measuring this strain.

If measuring pressure Pm becomes greater than the pre-determined value, measuring diaphragm 23 contacts the lower surface of air gap chamber 22 as in the figure and is protected from breakage due to overpressure.

Such device is manufactured as shown in FIGS. 3 to 8.

Figure 3:
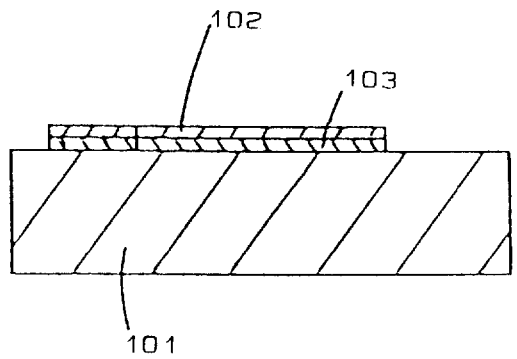
FIG. 3 indicates a drawing explaining the photo-lithography process in the present invention.

(a) As shown in FIG. 3, SOI silicon layer 102 and silicon oxide film 103 of SOI wafer 101 are removed by photo-lithography leaving the required portions.

Figure 4:
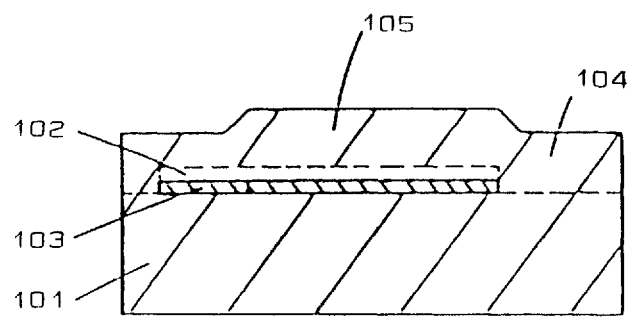
FIG. 4 indicates a drawing explaining the measuring diaphragm forming process in the present invention.

(b) As shown in FIG. 4, epitaxial growth layer 104 is made on SOI wafer 101 to form measuring diaphragm 105.

Figure 5:
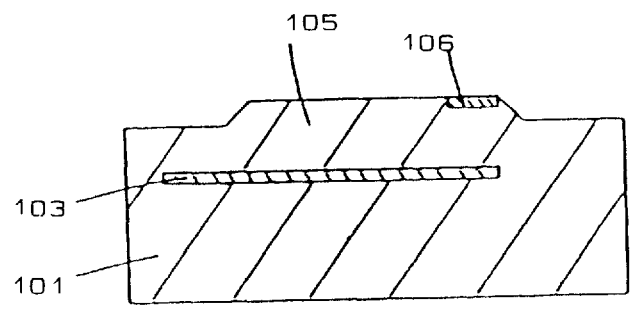
FIG. 5 shows a drawing explaining the strain detection element forming process in the present invention.

(c) As shown in FIG. 5, strain detection element 106 is formed on measuring diaphragm 105.

Figure 6:
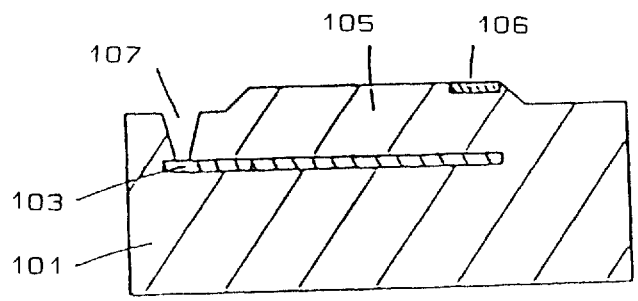
FIG. 6 shows a drawing explaining the connecting hole forming process in the present invention.

(d) As shown in FIG. 6, connecting hole 107 adjoining silicon oxide film 103 from the surface of SOI wafer 101.

Figure 7:
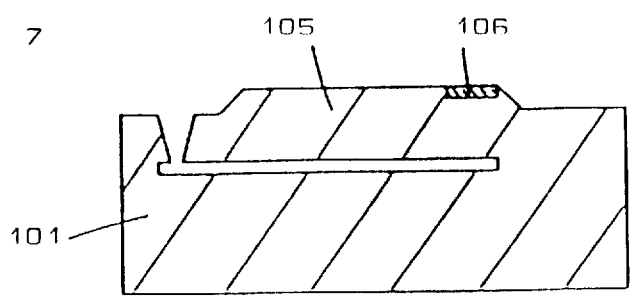
FIG. 7 indicates a drawing explaining the insulation film removal process in the present invention.

(e) As shown in FIG. 7, silicon oxide film 103 is removed by selective etching operated through connecting hole 107.

Figure 8:
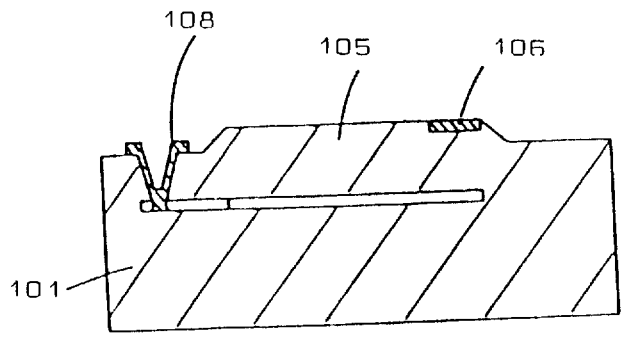
FIG. 8 shows a drawing explaining the connecting hole filling process in the present invention.

(f) As shown in FIG. 8, polysilicon film 108 is made by the reduced-pressure CVD process to fill connecting hole 107.

As a result, since the semiconductor pressure sensor can be constructed fully with single crystal silicon, (1) A high-sensitivity strain detection element 26 can be incorporated, and (2) A measuring diaphragm 23 which is more stable and has a higher accuracy than polysilicon materials can be constructed.

As an example of a trial product, for instance, a full pressure of 180 kPa and an output voltage of 18 mV/V have been achieved with a sensor 0.6 mm square. Also, semiconductor pressure sensors having a withstanding pressure of 10 MPa or more have been obtained.

Consequently, the present invention can provide a highly reliable semiconductor pressure sensor having excellent accuracy and sensitivity, constructed with epitaxially grown silicon single crystals and its manufacturing method.

What is claimed is:

1. A semiconductor pressure sensor consisting of:

a single crystal silicon substrate having a planar surface;

a closed air gap provided on said planar surface of said substrate by a process wherein an insulating layer having two planar surfaces is disposed on part of said planar surface of said substrate and a silicon layer having two planar surfaces is disposed to have one planar surface thereof on top of one of said two planar surfaces of said insulating layer, then a measuring diaphragm is epitaxially grown on top of the other of said two planar surfaces of said silicon layer and on top of an exposed part of said planar surface of said substrate, then said insulating layer is removed thereby to leave said air gap, and then said air gap is closed;

said measuring diaphragm being a silicon layer epitaxially grown on said other of said two planar surfaces of said silicon layer and said exposed part of said planar surface of said substrate so that the entire arrangement consists of a single crystal of silicon with said measuring diaphragm being movable into said air gap; and a strain detector separate from said single crystal of silicon disposed on a top surface of said measuring diaphragm.

2. The sensor of claim 1, wherein said air gap is closed and at an approximate vacuum.

3. A method of manufacturing a semiconductor pressure sensor wherein an air gap is incorporated within a single crystal of silicon with a measuring diaphragm also being of the same single crystal of silicon, said method comprising the steps of:

removing a portion of an insulating layer and a silicon layer disposed on top of said insulating layer from a silicon substrate thereby leaving a portion of said insulating layer and said silicon layer on top of said silicon substrate;

epitaxially growing a silicon structure on top of said silicon layer and an exposed surface of said silicon substrate so that said insulating layer is covered with a single crystal of silicon and so that the silicon structure above said insulating layer will form a measuring diaphragm;

removing said insulating layer to form said air gap so that the entire arrangement consists of a single crystal of silicon with said measuring diaphragm being movable into said air gap created by the removal of said insulating layer; and providing a strain detector separate from said single crystal of silicon on top of said silicon structure forming said measuring diaphragm.

4. The method of claim 3, wherein said air gap is closed and the pressure therein is an approximate vacuum.

5. The method of claim 3, wherein said removal step comprises a substep of forming a connecting hole through said silicon structure and adjoining and connected to said insulating layer and the selectively etching said insulating layer through said connecting hole; and further comprising the step of filling said connecting hole with a thin film so that said air gap formed by removal of said insulating layer is closed.

* * * * *